July 21, 1964

W. R. WINTERS 3,141,259

AGRICULTURAL DUSTING

Filed Oct. 26, 1960

WILLIS R. WINTERS
*INVENTOR.*

BY *[signature]*
*Atty.*

July 21, 1964  W. R. WINTERS  3,141,259
AGRICULTURAL DUSTING

Filed Oct. 26, 1960  2 Sheets-Sheet 2

WILLIS R. WINTERS
INVENTOR.

BY
Atty.

3,141,259
AGRICULTURAL DUSTING
Willis R. Winters, P.O. Box 8, Verhalen, Rural Station, Pecos, Tex.
Filed Oct. 26, 1960, Ser. No. 65,224
3 Claims. (Cl. 43—148)

This invention pertains to agricultural dusting and more particularly to applying dry pulverulent chemicals to growing plants.

In agricultural operations it is often necessary to poison insects. Traditionally, dusting is one method of applying poisons. Benefits may be derived from applying certain trace minerals to the foliage of plants.

The active chemicals may be mixed in an inert carrier such as talc. It is easier to meter the correct amount of chemicals when they are so diluted.

An object of this invention is to provide improved method and means for applying the agricultural dust to growing plants.

Another object of this invention is to provide an improved inert carrier for the active ingredient.

Another object is to provide an improved physical form of the dust.

Another object is to provide an improved mixture including not only the insecticide but trace minerals in a single dust.

Another object is to provide an insecticide with rapid action and lasting residual effects.

A further object is to reduce the "drift" of the dust.

A further object is to provide means for electrically charging the dust so that it is better applied to the growing plants.

A further object is to provide improved means for electrifying dust particles to be applied to growing plants.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, the different views of which are not necessarily to the same scale, in which.

Figure 1:
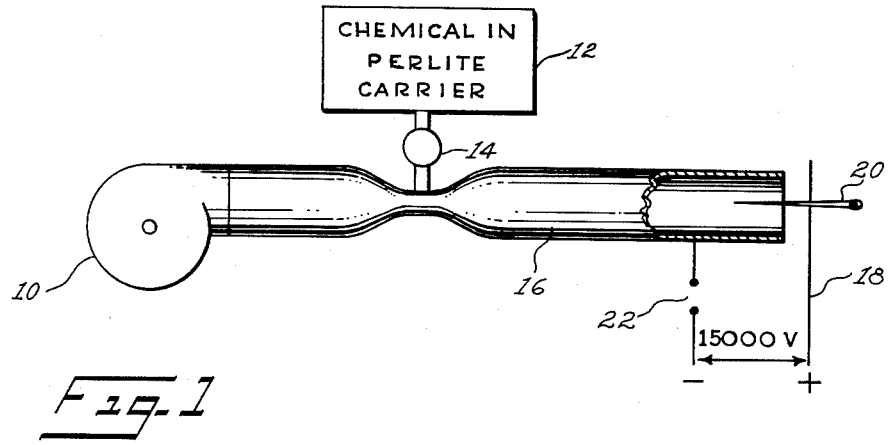
FIG. 1 is a schematic view with parts broken away showing an apparatus according to this invention.

As may be seen in the accompanying drawings, equipment for practicing this invention includes fan 10 for producing a blast of wind to carry the chemicals. The chemicals are carried in hopper 12 and dispensed through dropper 14 into wind tube 16 connected to fan 10. So much is conventional. The chemicals used may include insecticides, fungicides, hormones, and fertilizer. For example, garlic may be added to control blight or a desiccant dust added to kill small insects by drying them.

At the terminal of the wind tube, line 18 carries a positive electrical charge, the tube 16 itself being negative in respect to line 18. A needle or pointed instrument 20 is connected to the line at the center of the tube and coaxial therewith. The line runs at right angles to the discharge of the tube.

Figure 2:
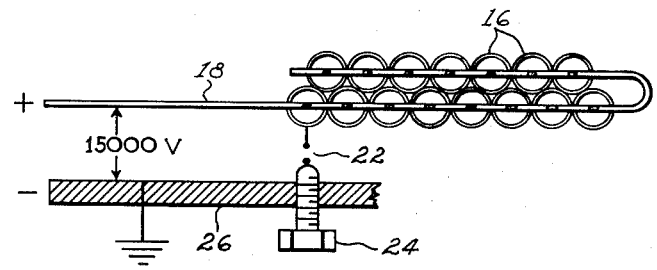
FIG. 2 is an end view partially schematic showing apparatus as would be used on aircraft.
Figure 3:
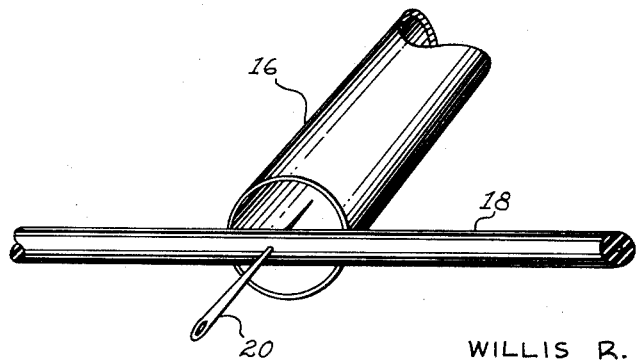
FIG. 3 is an enlarged perspective view of part of the apparatus according to this invention.

The tube is electrically connected through spark gap 22 to the negative side of a direct current power supply capable of a potential of 15,000 volts. Such power supplies are well known and are not further discussed here. Although the drawing in FIG. 2 shows that one side of the power supply shall be at ground potential, it will be understood that this is only for electrical reference. However, the negative side of the power supply is insulated from the tube 16 because of the spark gap 22. The tubes themselves might be grounded and the negative side of the power supply negative with respect to ground.

Spark gap 22 is adjustable by having one contact on threaded screw 24. The screw is threaded through some structure 26. The screw 24 would be at ground potential so that it might be adjusted in operation.

In construction I have good success using for line 18 an insulated line normally adapted for use with television video tubes. To obtain the electron discharge point 20 I have good success piercing this insulated conductor with an ordinary sewing needle. I have found that this in effect gives two discharge points, one at each sharpened end. The needle is inserted through the middle of the line, the insulation holding it in place and at this voltage it is not necessary to make special effort to cause good electrical contact with the electrical conductor in the center of the line.

For use in an aircraft, there should be several tubes as illustrated in FIG. 2. The diameter of the tubes are limited for best electrical discharge into the dust. It is understood with an airplane that a fan is not necessary. There is sufficient wind merely to have the front of the tube open to the air as is conventional. However, if the apparatus is to be used upon ground traveling equipment, it is desirable to have a tube located directly over each row of growing plants. Therefore, the tubes 16 would be separated; for example, 40 inches apart.

In practicing this invention, I have found it desirable to use a perlite vehicle. Perlite is a common mineral in the Southwestern United States. I have found that perlite gives better results with the electrical discharge in a better distribution of the material upon the leaves of the growing plants. Furthermore, by using expanded perlite, the weight is greatly reduced for the same volume or number of particles. This weight reduction is an advantage in aerial application. In some cases it will be desirable to cause the perlite vehicle to absorb the active ingredients.

In this regard, I prefer to use a very finely ground material. More specifically, I prefer to use what is known to the trade as air milled material. By this it is meant that the particles have a diameter of 2–6 microns. By using material of this size, less insecticide is effective. E.g., by using as little as ¼ the amount of insecticide normally used, I can obtain equal results.

However, it appears that in using finely ground insecticide, that some residual effect is lost. Therefore, I prefer in using a dust having about ½ of the active ingredients air milled and the other ½ milled to normal fineness. Normal fineness is about 44 microns, meaning it will pass a 325 mesh screen.

The benefits of applying trace minerals to growing plants has been recognized. By trace minerals, it is meant these metallic elements which are found in plants but not nitrogen, phosphorus and potassium included in normal fertilizer. For the plant to absorb these through the foliage, it is essential that they be air milled, i.e., with a size of less than 6 microns.

The spark gap 22 is adjustable between the ranges of zero to one-half inch, i.e., the spark gap may be all the way closed so that the two contacts are touching or the contacts may be separated by as much as ½ inch. I have found that best results are had at different setting of the contacts for different conditions including the following typical factors: (*a*) the dust being used, (*b*) the relative humidity of the air, (c) the temperature, (d) the amount of dust admitted into the air. Therefore, I have found it desirable periodically to adjust the spark gap for best results. I prefer to adjust the spark gap with the machinery operating so that maximum brightness of corona is obtained around the electrical discharge point 20. The usual spark gap will be about 1/16 inch.

The power supply, as stated before, is capable of 15,000 volts, direct current. In some instances only 10,000 volts is necessary. I have found it desirable, though not necessary, to provide a voltage regulator for the power supply.

Figure 4:
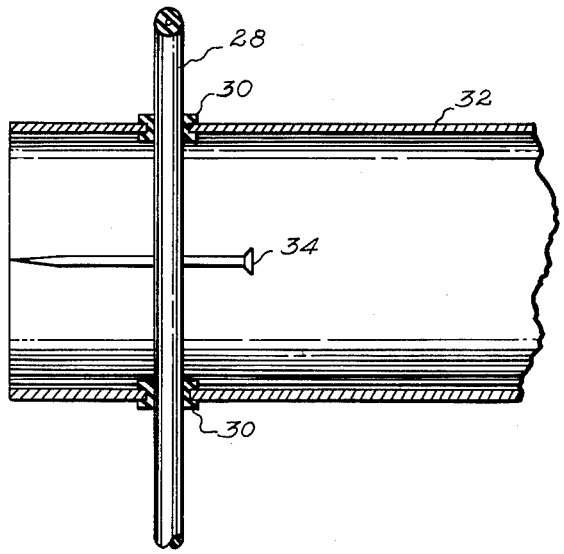
FIG. 4 is an enlarged axial sectional view of a modified embodiment.

FIG. 4 illustrates a modification which in many instances is preferred. Therein line 28 passes through grommets 30 in holes in cylindrical tube 32. The line is normal to the tube axis. An ordinary dress pin 34 (as used by a seamstress) pierces the line. The pin is co-axial with the tube and the point is flush with the terminal of the tube. This arrangement could be expressed as an elongated pointed element terminating in the same plane as the tube terminates.

Figure 5:
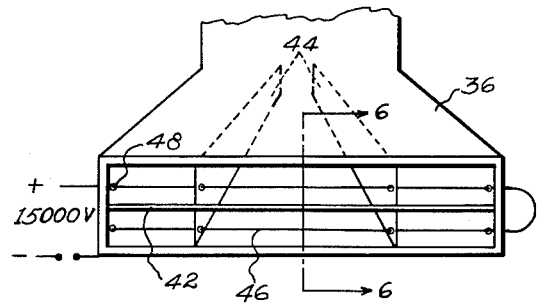
FIG. 5 is a perspective view of a modified embodiment for aircraft.
Figure 6:
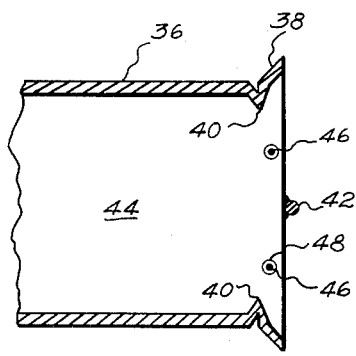
FIG. 6 is a partial sectional view taken on line 6—6 of FIG. 5.

FIGS. 5 and 6 illustrate a modified applicator for aircraft. Therein is illustrated the discharge of rectangular bell shaped tube 36 of conventional equipment. Adjacent the reinforcing flange 38 the transitional portion is modified by peening to form sharp edge 40. A heavy wire 42 is welded to each of the side walls of the bell and to the baffles 44. The positive electrode is in the form of very fine wire 46 which extends through grommets 48. Piano wire may be used for the wire 46. The grommets insulate the wire from the bell wherever the wire passes through holes in the side of the bell or the baffles. As seen the wire 46 is located halfway between the wire 42 and edge 40. The wire 46 enters through one side, passes out the other, and back in. The distance from wire 46 to edge 40 is about one inch.

It will be apparent that the embodiments shown are only exemplary and that various modifications can be made in construction, materials, and arrangement within the scope of the invention as defined in the appended claims.

I claim as my invention:

1. In an apparatus for dusting agricultural chemicals upon growing crops including a tube and means for blowing a chemical-air mixture through the tube, the improvement comprising: an insulated electrical conductor extending normal to the axis of the tube, and an elongated pointed conductor element coaxial with the tube pierced through the insulated electrical conductor.

2. The invention as defined in claim 1 with the addition of a source of high voltage direct current electrical potential and a spark gap, the positive side of the source connected to the electrical conductor, the negative side of the source connected through said spark gap to the tube.

3. The invention as defined in claim 2 wherein the contacts of the spark gap may be adjusted so that an air gap varying from zero to one-half inch exists between them whereby the air gap between the contacts may be adjusted for varying conditions of humidity, temperature, and chemicals being used.

References Cited in the file of this patent

UNITED STATES PATENTS

| | | |
|---|---|---|
| 1,280,110 | Slate et al. | Sept. 24, 1918 |
| 1,282,697 | Johnson | Oct. 22, 1918 |
| 1,598,269 | Derr | Aug. 31, 1926 |
| 1,787,585 | McBeth et al. | Jan. 6, 1931 |
| 2,221,338 | Wintermute | Nov. 12, 1940 |
| 2,659,841 | Hampe | Nov. 17, 1953 |

FOREIGN PATENTS

| | | |
|---|---|---|
| 934,683 | France | Jan. 19, 1948 |